United States Patent
Hsueh et al.

(12) 
(10) Patent No.: US 12,439,004 B2
(45) Date of Patent: Oct. 7, 2025

(54) FEEDBACK CONTROL PANORAMIC MONITORING AND FEEDBACK CONTROL SYSTEM AND METHOD

(71) Applicant: NavCore Tech. Co., Ltd., Taoyuan (TW)

(72) Inventors: Chi-chiang Hsueh, Taoyuan (TW); Hsin-lung Hsieh, Taoyuan (TW); Ting-ching Yen, Taoyuan (TW); Pang-tzu Liu, Taoyuan (TW); Yu-hsuan Liao, Taoyuan (TW)

(73) Assignee: NavCore Tech. Co., Ltd., Taoyuan (TW)

( * ) Notice: Subject to any disclaimer, the term of this patent is extended or adjusted under 35 U.S.C. 154(b) by 0 days.

(21) Appl. No.: 18/764,455

(22) Filed: Jul. 5, 2024

(65) Prior Publication Data
US 2025/0016290 A1 Jan. 9, 2025

Related U.S. Application Data

(60) Provisional application No. 63/525,178, filed on Jul. 6, 2023.

(51) Int. Cl.
*H04N 7/18* (2006.01)
*G06V 20/40* (2022.01)
(Continued)

(52) U.S. Cl.
CPC .......... *H04N 7/181* (2013.01); *G06V 20/40* (2022.01); *G06V 20/52* (2022.01); *H04N 23/62* (2023.01); *H04N 23/661* (2023.01)

(58) Field of Classification Search
None
See application file for complete search history.

(56) References Cited

U.S. PATENT DOCUMENTS

| 2018/0225805 A1* | 8/2018 | Brandt | H04N 23/45 |
| 2019/0132512 A1* | 5/2019 | Jones | H04N 23/698 |

(Continued)

FOREIGN PATENT DOCUMENTS

| TW | 201033946 | 9/2010 |
| TW | 202120385 | 6/2021 |
| TW | 202244800 | 11/2022 |

OTHER PUBLICATIONS

Decision of Examination and Search Report Dated Dec. 28, 2024 From the Intellectual Property Office, Ministry of Economic Affairs of the Republic of Taiwan, R.O.C. Re. Application No. 11321089380. (11 Pages).

*Primary Examiner* — Daniel T Tekle

(57) ABSTRACT

A panoramic monitoring and feedback control system and a panoramic monitoring and feedback control method, which are configured to assist monitors to obtain real-time information of a monitored field and eliminate an abnormal situation. The panoramic monitoring and feedback control system includes: a host-system, configured to display real-time information of the monitored field; at least one sub-system, connected to the host-system, including a plurality of wide-angle cameras, configured to receive sensing conditions, operate signals, and automatic operation signals; and at least one external system including sensor modules and equipment devices. The present application uses the host-system to display a diversion screen of the equipment being operated during the abnormal situation, and at the same time, operates the equipment and receives external feedback through multiple control methods, to accurately control the equipment shown by the real-time information of the monitored field and improve an effect of monitoring and feedback control.

20 Claims, 11 Drawing Sheets

(51) Int. Cl.
*G06V 20/52* (2022.01)
*H04N 23/62* (2023.01)
*H04N 23/661* (2023.01)

(56) References Cited

U.S. PATENT DOCUMENTS

| | | | |
|---|---|---|---|
| 2019/0172039 A1* | 6/2019 | Kambara | G06V 20/52 |
| 2022/0198620 A1* | 6/2022 | Berthels | H04N 23/698 |
| 2023/0097627 A1* | 3/2023 | Piironen | B66B 5/0018 |
| | | | 198/321 |
| 2025/0016290 A1* | 1/2025 | Hsueh | H04N 23/62 |

* cited by examiner

FEEDBACK CONTROL PANORAMIC MONITORING AND FEEDBACK CONTROL SYSTEM AND METHOD

CROSS-REFERENCE TO RELATED APPLICATIONS

This application claims the benefit of priority under 35 USC § 119 (e) of U.S. Provisional Patent Application No. 63/525,178, filed on Jul. 6, 2023, the contents of which are incorporated by reference as if fully set forth herein in their entirety.

FIELD OF INVENTION

The present application relates to a panoramic monitoring and feedback control system and method, and in particular, to a panoramic monitoring and feedback control system and method that instantly reflects the status of the monitoring environment and controls on-site equipment.

BACKGROUND OF INVENTION

The environmental monitoring method that uses to obtain the environmental parameters and photographic images of the monitoring site will be restricted by site conditions of abnormal situations. For example, for sudden and temporary anomalies, even if the sensing data is analyzed, it is still difficult to respond to changes in synchronously monitored environment conditions and immediately avoid the interaction of different types of emergencies. Moreover, since the effects of changes in monitored environmental conditions on each sub-system will be accumulated with different weights in the monitoring results, abnormal situations are difficult to eliminate through the remote control of the host-system.

In view of this, it is necessary to provide a panoramic monitoring and feedback control system and method to solve the above technical problems.

SUMMARY OF INVENTION

In order to solve the problems of the above-mentioned conventional technologies, the purpose of the present application is to provide a panoramic monitoring feedback control system and method, which can assist the monitor to obtain accurate real-time information of the monitored field and quickly eliminate abnormal situations.

In a first aspect, the present application provides a panoramic monitoring and feedback control system configured to assist monitors in obtaining a real-time information of a monitored field and eliminating an abnormal situation, wherein the panoramic monitoring and feedback control system comprises: a host-system configured to display the real-time information of the monitored field and output a sensing condition to detect the abnormal situation, an operation signal to eliminate the abnormal situation, and an automatic operation signal to automatically eliminate the abnormal situation; at least one sub-system connected to the host-system, wherein the sub-system comprises a plurality of wide-angle cameras, the sub-system configured to receive the sensing condition, the operation signal, and the automatic operation signal, and wherein the sub-system notifies the host-system that the abnormal situation occurs, and records a troubleshooting process video of the abnormal situation when a sensing signal received by the sub-system and a wide-angle dynamic real-time image of the at least one wide-angle camera meet the sensing condition; and at least one external system connected to the sub-system, wherein the external system comprises: a sensor module configured to sense environmental parameters of the monitored environment to generate the sensing signal; and an equipment device configured for on-site personnel to operate and perform the operations required by the operation signal and the automatic operation signal to eliminate the abnormal situation; wherein the troubleshooting process video is a video of the operation process of the equipment device during the abnormal situation, and wherein the real-time information of the monitored field displayed by the host-system comprises a split screen of the operation process of the equipment device.

In a second aspect, the present application provides a panoramic monitoring and feedback control system to assist monitors in obtaining a real-time information of a monitored field, wherein the panoramic monitoring and feedback control system includes: a host-system configured to display the real-time information of the monitored field, wherein the host-system stores a sensing condition for detecting an abnormal situation; at least one sub-system connected to the host-system, wherein the sub-system comprises a plurality of wide-angle cameras and transmits a wide-angle dynamic real-time image of at least one wide-angle camera to the host-system; and at least one external system connected to the host-system, wherein the external system comprises a database; wherein the host-system displays a troubleshooting process video of the abnormal situation during the occurrence of the abnormal situation when the host-system receives data that satisfies the sensing condition from the data database, and wherein the troubleshooting process video is a video of an operation process of an equipment device connected to the external system in the wide-angle dynamic real-time image, and wherein the real-time information of the monitored field displayed by the host-system comprises a split screen of the operation process of the equipment device.

In a third aspect, the present application provides a panoramic monitoring and feedback control method, performed by a host-system, at least one sub-system connected to the host-system, and an external system connected to the sub-system and comprising a sensor module and an equipment device, wherein the method is executed to assist the monitor in obtaining real-time information of the monitored field and eliminating an abnormal situation, wherein the panoramic monitoring and feedback control method comprises: using the host-system to display the real-time information of the monitored field and output a sensing condition to detect the abnormal situation, an operation signal to eliminate the abnormal situation, and an automatic operation signal to automatically eliminate the abnormal situation, wherein the real-time information of the monitored field displayed by the host-system comprises a split screen of the operation process of the equipment device; receiving the sensing condition, the operation signal, and the automatic operation signal by using the sub-system, and wherein the sub-system notifies the host-system that the abnormal situation occurs, and records a troubleshooting process video of the abnormal situation when a sensing signal received by the sub-system and a wide-angle dynamic real-time image of the at least one wide-angle camera meet the sensing condition, wherein the troubleshooting process video is a video of the operation process of the equipment device during the abnormal situation; and using the sensor module to sense environmental parameters of the monitored environment to generate the sensing signal; and using the equipment device to perform the operations required by the operation signal and the automatic operation signal to eliminate the abnormal situation.

Compared with the prior art, the present application provides a panoramic monitoring feedback control system and a panoramic monitoring and feedback control method, which uses the host-system to display the split screen of the equipment device operation process during the abnormal situation, and at the same time simultaneously operates the equipment devices and receives external feedback through a plurality of control methods to accurately control the equipment covered by real-time information in the monitored field. Moreover, the retained operation history is used to improve the monitoring feedback control effect and reduce the time spent on feedback control.

The purpose, technical content, characteristics and achieved effects of the present application will be more easily understood through detailed descriptions of specific embodiments and accompanying figures.

DETAILED DESCRIPTION OF EMBODIMENTS

The technical solutions in the embodiments of the present application will be clearly and completely described below in conjunction with the accompanying figures in the embodiments of the present application. Obviously, the described embodiments are only part of the embodiments of the present application, not all the embodiments. In addition, it should be understood that the specific embodiments described here are only used to illustrate and explain the present application and are not used to limit the present application.

Please refer to the figures in the accompanying figures, where the same component symbols represent the same components.

Figure 1:
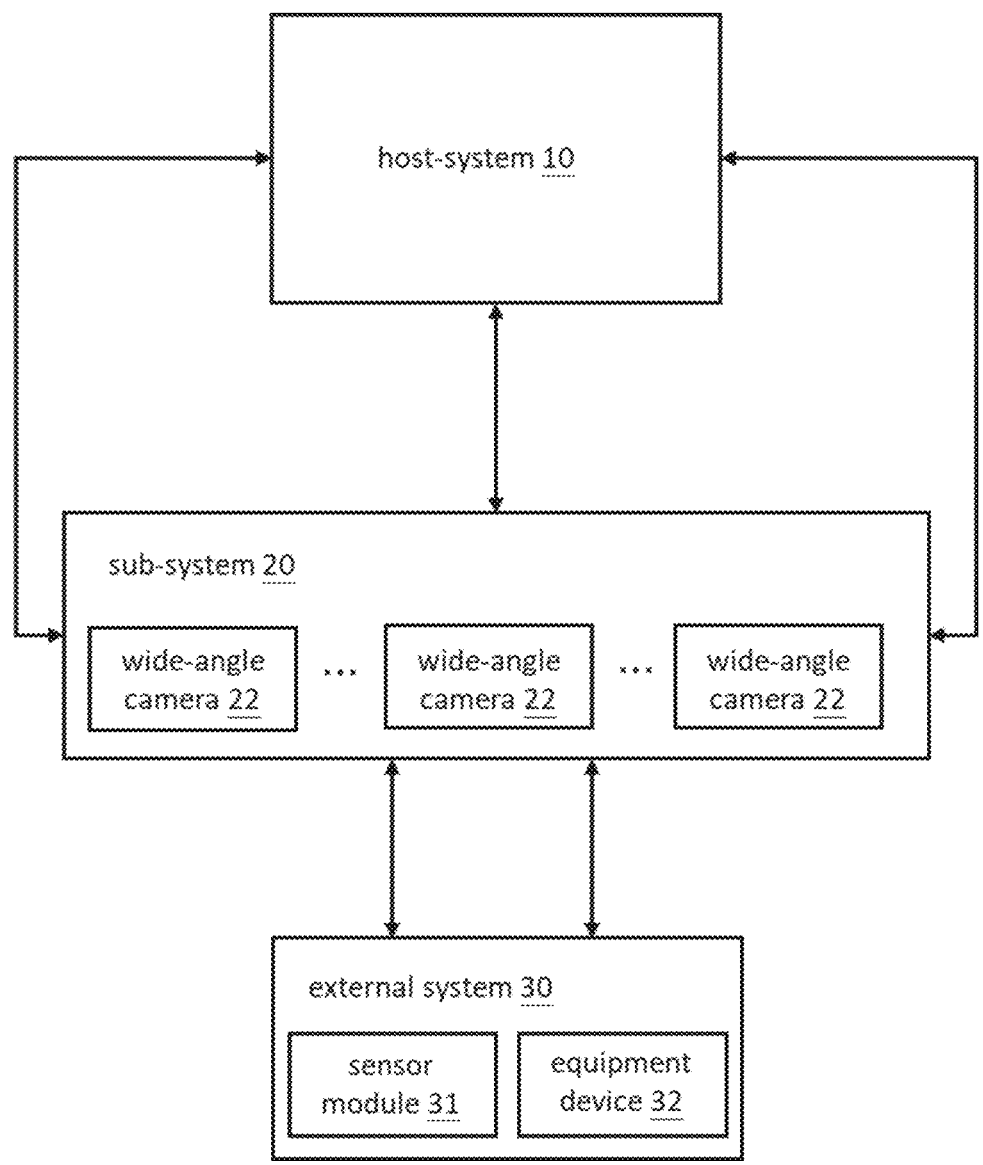
FIG. 1 is a block diagram of a panoramic monitoring and feedback control system according to one embodiment of the present application.

The present application provides a panoramic monitoring and feedback control system to assist monitors in obtaining a real-time information of a monitored field and eliminating abnormal situations. Please refer to FIG. 1. The panoramic monitoring and feedback control system provided by the present application includes a host-system 10, at least one sub-system 20 connected to the host-system 10, and at least one external system 30 connected to the sub-system 20. The host-system 10 is configured to display real-time information of the monitored field, and to output sensing conditions for detecting abnormal situations, operation signals for eliminating abnormal situations, and automatic operation signals for automatically eliminating abnormal situations. At least one sub-system 20 is connected to the host-system 10. The sub-system 20 includes a plurality of wide-angle cameras. The sub-system 20 is configured to receive sensing conditions, operation signals, and automatic operation signals.

The sub-system 20 includes a processing unit that performs edge operations based on received data. The sub-system 20 notify the host-system 10 that the abnormal situation occurs when the sensing signal received by the sub-system 20 and the wide-angle dynamic real-time image of at least one wide-angle camera simultaneously meet the sensing conditions output by the host-system, and at the same time, record the environment image and the trouble-shooting process video of the abnormal situation according to the starting time point and end time point of the abnormal situation. Each sub-system 20 is connected to at least one external system 30, and the external system 30 includes at least one sensor module 31 and at least one equipment device 32. The sensor module 31 is configured to sense environmental parameters of the monitored environment to generate sensing signals. The equipment device 32 is configured for on-site personnel to operate and perform operations required by operation signals and automatic operation signals to eliminate abnormal situations.

Specifically, the troubleshooting process video is a video of the operation process of the equipment device 32 during abnormal situations. Through the transmission of the sub-system 20, the real-time information of the monitored field displayed by the host-system 10 includes the split screen of the operation process of the equipment device 32. The split images of the operation process of the equipment device 32 are captured through the sub-system 20.

Figure 2:
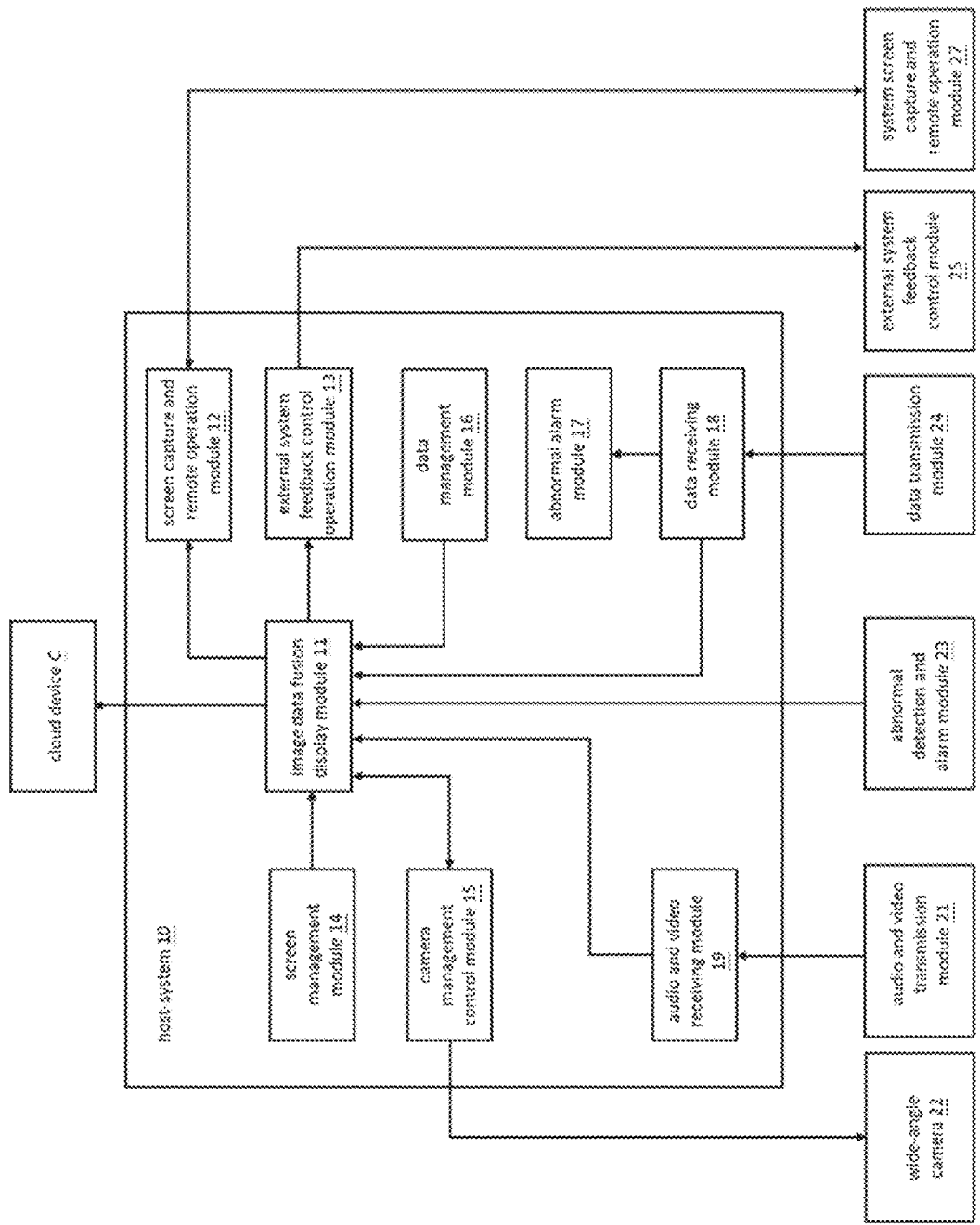
FIG. 2 is a block diagram of the host-system of the panoramic monitoring and feedback control system according to one embodiment of the present application.

Regarding the host-system 10 of the present application, please refer to FIG. 2 for further reference. In the embodiment of the present application, the host-system 10 includes an image data fusion display module 11, a camera management control module 15, and an audio and video receiving module 19. Through the image data fusion display module 11, the user can select, load, and input the parameters to be tracked, and the camera management control module 15 outputs the region of interest (ROI) conditions. Furthermore, the camera management control module 15 sends a message back to the data fusion display module 11 from the camera management control module 15 as to whether the setting of the area of interest of the wide-angle camera 22 in the sub-system 20 is completed. The host-system 10 receives the wide-angle dynamic real-time images transmitted through the sub-system 20, the split images of the operation process of the equipment device 32, and the troubleshooting process video during the abnormal situations by the audio and video receiving module 19.

As shown in FIG. 2, the host-system 10 further includes a data receiving module 18, a screen capture and remote operation module 12, and an external system feedback control operation module 13. The screen capture and remote operation module 12 is connected to the image data fusion display module 11. The host-system 10 can output an operation signal to the sub-system 20 by operating the screen capture and remote operation module 12 or by operating the image data fusion display module 11 in conjunction with the display screen of the image data fusion display module 11, or additionally output signals to the screen capture and remote operation module 12. The equipment device 32 that receives the operation signal feedbacks the control authority data through the sub-system 20, and the host-system 10 receives each control authority data through the screen capture and remote operation module 12. The operation signal output of the host-system 10 and the control authority data reception of all equipment devices 32 corresponding to the operation signal are completed through the screen capture and remote operation module 12.

Referring to FIG. 2, the image data fusion display module 11 is also connected to the external system feedback control operation module 13. The host-system 10 outputs automatic operation signals to the sub-system 20 through the external system feedback control operation module 13 and controls the equipment device 32 in the external system 30 through the sub-system 20. The host-system 10 outputs the sensing conditions for detecting abnormal situations through the external system feedback control operation module 13. The automatic operation signal includes automatic operation control instructions corresponding to monitoring conditions of defined abnormal situations. For example, automatic operation control instructions can be presented through instructions of a programmable logic controller (PLC) coupled with sensing conditions.

In the present application, the host-system 10, the sub-system 20, and the external system 30 are used to assist the monitor in obtaining real-time information of the monitored field and troubleshooting abnormal situations. In order to ensure that the sensing condition data and the automatic operation control instructions corresponding to the monitoring conditions of the defined abnormal situations are not contaminated by the operation signals and control authority data corresponding to each equipment device, the host-system 10 sets the screen capture and remote operation module 12 and the external system back-control operation module 13 respectively. Within the operation cycle of the automatic operation signal, the equipment device can be remotely controlled through the screen capture and remote operation module 12. In addition, the signal transmission for authorization authentication is completed through the screen capture and remote operation module 12, so that the signal transmission path for authorization authentication and the signal transmission path for feedback operation results are different. Therefore, the signal transmission process of remote operation can be omitted at the same time, avoiding unnecessary waste of time. At the same time, the screen capture and remote operation module 12 and the external system feedback control operation module 13 are used to improve the immediacy of abnormality elimination and the efficiency of eliminating abnormal situation.

In response to different applicable fields and setting purposes, the present application also proposes a variety of implementations, continuing the design of the aforementioned screen capture and remote operation module 12 and the external system feedback control operation module 13, to achieve a variety of operations equipment device 32 and a control method for receiving external feedback.

Figure 3:
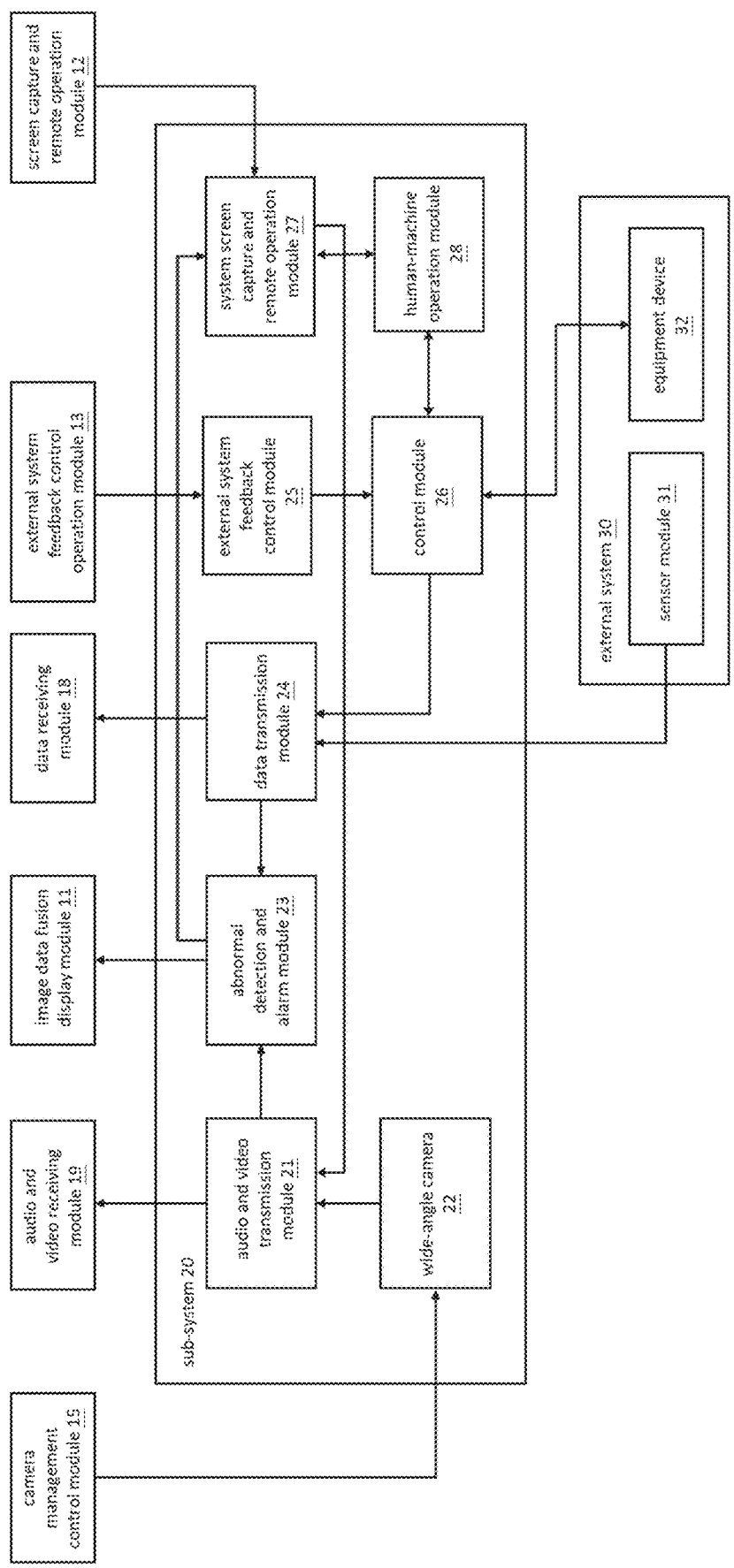
FIG. 3 is a block diagram of the sub-system and external system of the panoramic monitoring and feedback control system according to one embodiment of the present application.

Please refer to FIG. 3, FIG. 3 is a block diagram of the sub-system and the external system of the panoramic monitoring and feedback control system according to one embodiment of the present application. FIG. 3 is a representation that the sub-system 20 including one wide-angle camera 22. However, the sub-system 20 of the present application may include more than one wide-angle camera 22, and each wide-angle camera 22 outputs a wide-angle dynamic real-time image to the audio and video transmission module 21 respectively. The sub-system 20 further includes an audio and video transmission module 21, abnormal detection and alarm module 23, a data transmission module 24, and a system screen capture and remote operation module 27. The abnormal detection and alarm module 23 receives the data transmitted by the data transmission module 24 and the wide-angle dynamic real-time image transmitted by the audio and video transmission module 21 and analyzes it accordingly.

In one embodiment of the present application, the abnormal detection and alarm module 23 includes an edge computing module that performs edge computing. The abnormal detection and alarm module 23 notifies the host-system 10 that an abnormal situation occurs when the data and audio-visual data received by the abnormal detection and alarm module 23 meet the sensing conditions output by the host-system 10 for detecting abnormal situations, and the control system screen capture and remote operation module 27 records the troubleshooting process video during the abnormal situation.

The troubleshooting process video recorded by the control system screen capture and remote operation module 27 is transmitted to the audio and video transmission module 21 as part of the audio and video data transmitted by the audio and video transmission module 21 to the host-system 10. Therefore, the host-system 10 can display the troubleshooting process video in real time through the image data fusion display module 11. Alternatively, the host-system 10 stores the troubleshooting process video in the cloud device C connected to the image data fusion display module 11 through the image data fusion display module 11. The cloud device C includes a database that stores the troubleshooting process videos and a query and analysis module that can retrieve and analyze the data in the database. The image data fusion display module 11 can also present the result content analyzed by the query and analysis module. In some embodiments, the image data fusion display module 11 can also be connected to other displays to display real-time information of the monitored field, wide-angle dynamic real-time images transmitted through the sub-system 20, the split screen of the operation process of the equipment device 32, the troubleshooting process video of the abnormal situation, and the real-time information screen displayed by the host-system 10 on the connected display. The window management module 14 is configured to adjust the display screen of the image data fusion display module 11 and the display device connected to the image data fusion display module 11.

As shown in FIG. 3, the sub-system 20 further includes an external system feedback control module 25, a control module 26, and a human-machine operation module 28. The external system feedback control module 25 is connected to the host-system 10. More specifically, the external system feedback control module 25 is connected to the external system feedback control operation module 13 of the host-system 10, and the sub-system 20 receives the automatic operation signal through the external system feedback control module 25. The sub-system 20 also outputs automatic operation signals to the external system 30 through the external system feedback control module 25 to the equipment module 26. The sub-system 20 receives the operation signals output by the screen capture and remote operation module 12 of the host-system 10 through the system screen capture and remote operation module 27, and outputs the control permission information to the screen capture and remote operation module 12.

The screen capture and remote operation module 12 stops outputting operation signals to the same system screen capture and remote operation module 27 when the control authority data does not meet the detection standards. Or, the system screen capture and remote operation module 27 continues to receive operation signals but does not transmit the operation signals when the control authority data does not meet the detection standards. The system screen capture and remote operation module 27 receives the operation signal and transmits it to the control module 26 through the human-machine operation module 28 when the control authority data meets the detection standards.

The human-machine operation module 28 is connected to the system screen capture and remote operation module 27. The human-machine operation module 28 is configured to be operated by an operator at a setup location of the sub-system 20, and accordingly outputs a local operation signal to the control module 26. In one embodiment of the present application, the panel operation module 28 is an electronic device including a display device and an input device, e.g., a computer with a screen displaying an operation screen for the operator to receive messages and a real-time display of the received input signals on the operation screen. The split screen of the operation process of the equipment device 32 includes a triage screen of the process of the panel operation module 28 being operated by an operator at the setup of the subordinate system, and the triage screen of the process of the panel operation module 28 being operated by an operator at the setup of the subordinate system 20 is captured by the system screen capture and remote operation module 27.

In the present application, the control module 26 controls the equipment device 32 included in the external system 30 to eliminate the abnormal situations based on automatic operation signals, operation signals, and local operation signals which are generated through three types different operation modes and operation sources. At this time, the operation signals, automatic operation signals received by the sub-system 20, and the near-field operation signals generated by the sub-system 20 itself through the near-field personnel operating the human-machine operation module 28 can independently drive the equipment device 32, thereby improving the efficiency of the present application in troubleshooting abnormal situations.

The control module 26 also receives the operation result signal feedbacked by the equipment device 32 when the equipment device 32 is driven by the control module 26, and the operation result signal is transmitted to the data transmission module 24 as one of the basis for the abnormality detection and alarm module 23 to judge whether an abnormal situation has occurred. At this time, the sub-system 20 also transmits the operation result signal to the image data fusion display module 11 through the data transmission module 24, so that as part of the real-time information of the monitored field displayed by the host-system 10, it is immediately feedback to the controller that remote operate the screen capture and remote operation module 12, thereby improving the accuracy of remote troubleshooting of abnormal situations.

Please refer to FIG. 3, in the embodiment disclosed in FIG. 3, the external system 30 is composed of a sensor module 31 and an equipment device 32. The sensor module 31 is directly connected to the data transmission module 24. The data transmission module 24 receives the operation result signal from the control module 26 and receives the sensing signal from the sensor module 31. At this time, there is a signal transmission path for unidirectional transmission of sensing signals between the sub-system 20 and the external system 30, and there is also a signal transmission path for bidirectional transmission between the control module 26 and the equipment device 32.

However, the signals transmitted by the two signal paths of one-way transmission of sensing signals and interactive transmission of automatic operation signals, operation signals, and local operation signals all affect the interpretation of abnormal situations by the abnormality detection and alarm module 23. In view of this, the present application also proposes another solution to accurately feedback the data of abnormal situation through the external system 30 without affecting the elimination of abnormal situation.

Figure 4:
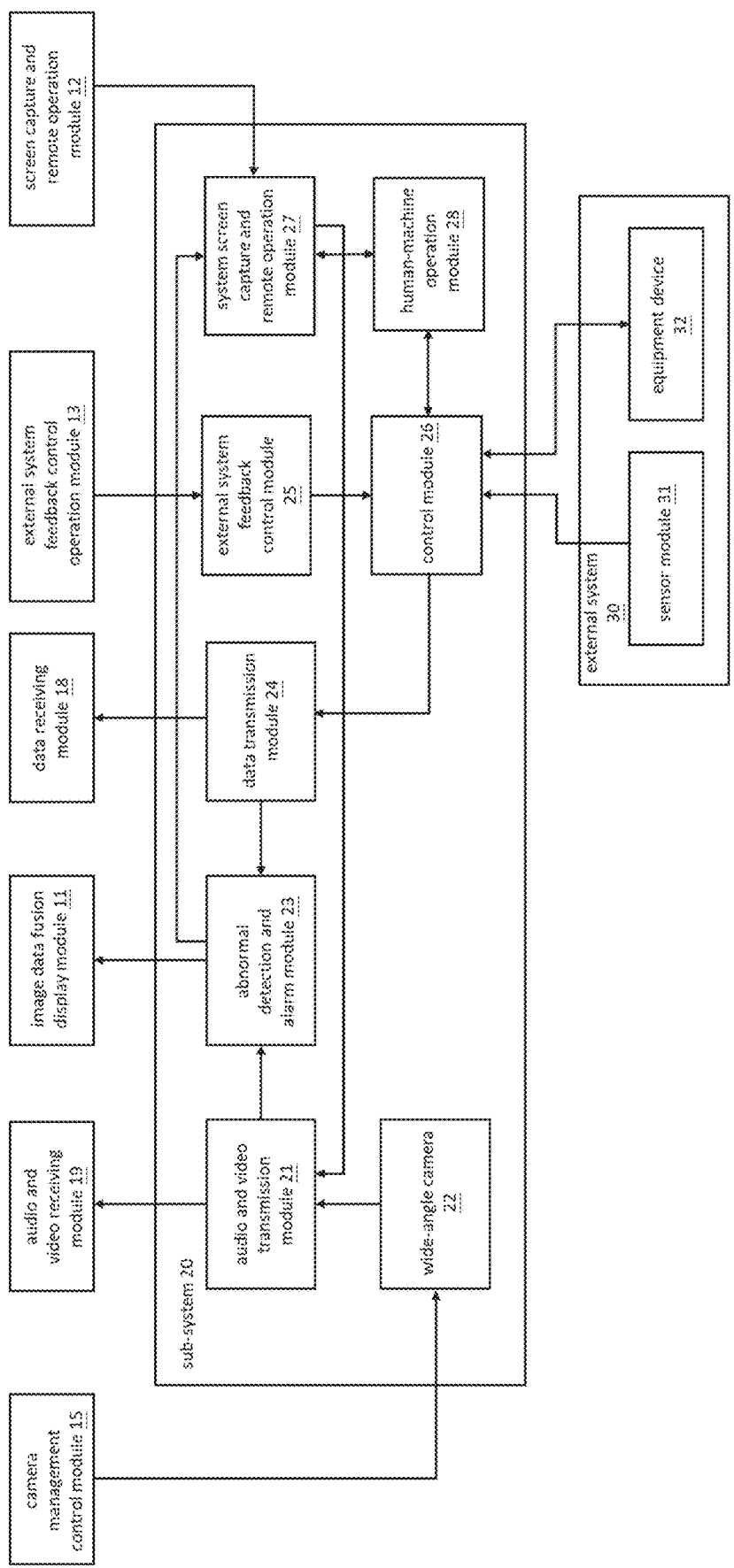
FIG. 4 is a block diagram of the sub-system and external system of the panoramic monitoring and feedback control system according to one embodiment of the present application.

Please refer to FIG. 4, which shows a block diagram of the sub-system and the external system of the panoramic monitoring feedback control system according to another embodiment of the present application. The external system 30 is composed of a sensor module 31 and an equipment device 32. The control module 26 is connected to the external system feedback control module 25 and the human-machine operation module 28. The control module 26 is configured to control the equipment device 32 according to the automatic operation signal, the local operation signal, and the operation signal, and to receive the operation result signal feedback from the equipment device 32 and the sensing signal generated by the sensor module 31.

In the embodiment of FIG. 4, the data transmission module 24 is connected to the control module 26. The data transmission module 24 receives the operation result signal and the sensing signal through the control module 26, and transmits the received operation result signal and sensing signal to the host-system 10 and the abnormal detection and alarm module 23. Therefore, the sub-system 20 and the external system 30 can exchange and transmit signals through a single signal path, so that the operation result signal and the sensing signal can be used as the basis for the abnormality detection and alarm module 23 to determine whether an abnormal situation has occurred, and the operation result signal and the sensing signal can be included in the real-time information of the monitored field displayed by the host-system 10.

However, although the embodiment provided in FIG. 4 of the present application can maximize the transmission path between the sub-system 20 and the external system 30, for the same reason, when the signal transmission between the control module 26 and the equipment device 32 broken, the panoramic monitoring and feedback control system of the present application will not be able to eliminate abnormal situations. In view of this, the present application also proposes another solution to control the external system 30 through the sub-system 20 to eliminate abnormal situations. In addition to not affecting the execution of abnormal situation elimination, and even if some signals transmission channel fails between the sub-system 20 and the external system 30, the panoramic monitoring and feedback control system can still retain the ability to eliminate abnormal situations.

Figure 5:
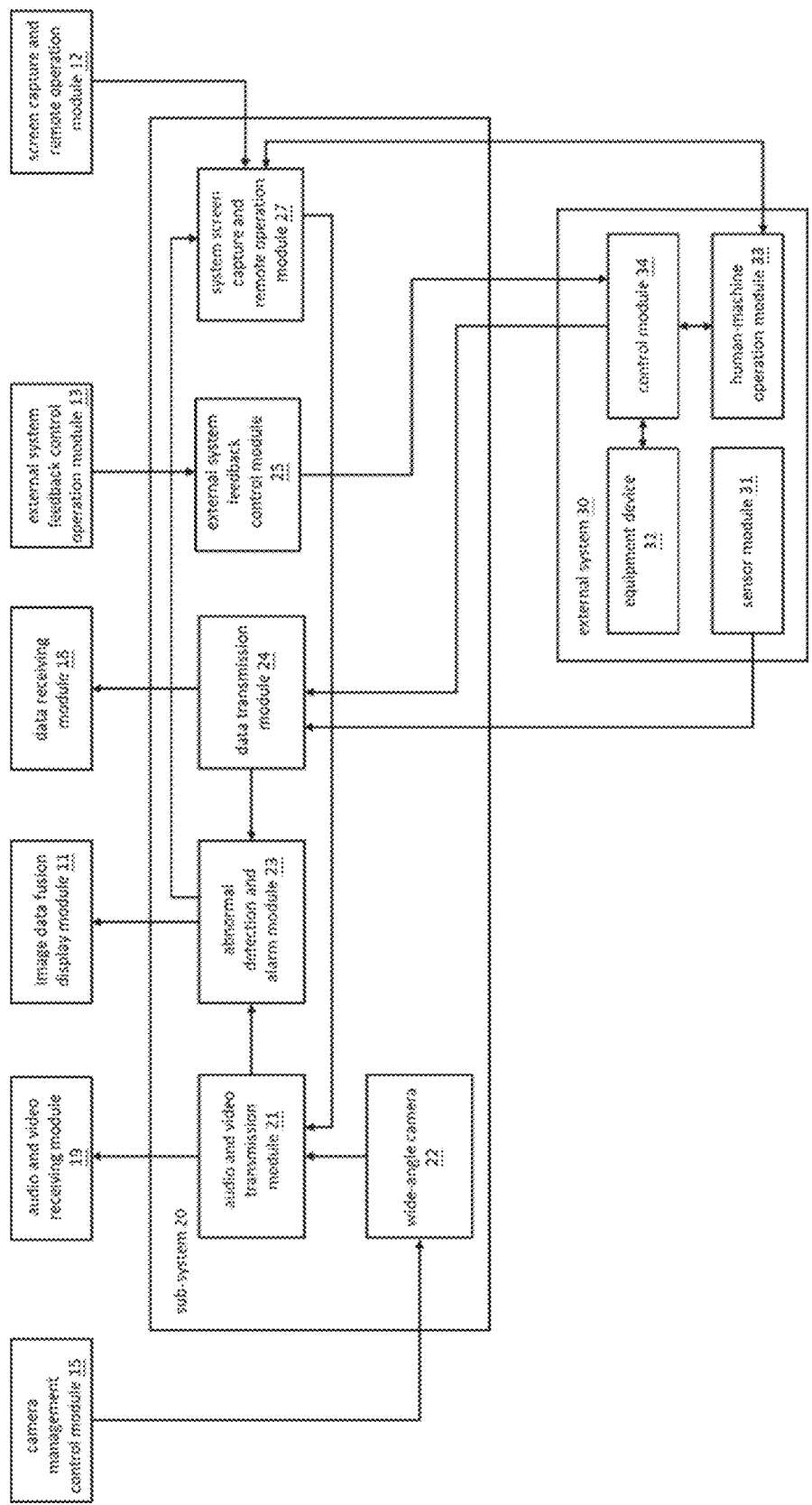
FIG. 5 is a block diagram of the sub-system and external system of the panoramic monitoring and feedback control system according to one embodiment of the present application.

Please refer to FIG. 5, which shows a block diagram of the sub-system and the external system of the panoramic monitoring and feedback control system according to yet another embodiment of the present application. In this embodiment, the sub-system 20 further includes an external system feedback control module 25, a system screen capture and remote operation module 27, and a data transmission module 24. The sub-system 20 receives the automatic operation signal through the external system feedback control module 25. The system screen capture and remote operation module 27 is configured to receive the operation signal and output control authority data to the screen capture and remote operation module 12. The sub-system 20 records the troubleshooting process video through the system screen capture and remote operation module 27. The data transmission module 24 is configured to transmit signals to the host-system 10.

As shown in FIG. 5, in this embodiment, the external system 30 includes a sensor module 31, an equipment device 32, a human-machine operation module 33, and a control module 34. The human-machine operation module 33 is connected to the system screen capture and remote operation module 27. The human-machine operation module 33 is configured to be operated by an operator at the location of the external system 30, and to output local operation signals accordingly. The control module 34 is configured to control the equipment device 32 according to the automatic operation signal, the local operation signal, and the operation signal. The control module 34 also receives the operation result signal feedbacked by the equipment device 32 and transmits the operation result signal to the data transmission module 24 when the equipment device 32 is driven by the control module 34.

In the embodiment disclosed in FIG. 5, the sensing signal generated by the sensor module 31 is directly transmitted to the data transmission module 24 through the sensor module 31, and the data transmission module 24 transmits the received operation result signals and sensing signals to the host-system 10 and the abnormal detection and alarm module 23.

Supplementary explanation is that, in the embodiment disclosed in FIG. 5, the split screen of the operation process of the equipment device 32 includes the split screen of the process of the human-machine operation module 33 being operated by the operator at the location of the external system 30. The split screen of the process in which the human-machine operation module 33 is operated by the operator at the location of the external system 30 is captured through the system screen capture and remote operation module 27.

In this embodiment, the human-machine operation module 33 is provided in the external system 30, so that the panoramic monitoring and feedback control system provided by the present application can be deployed to monitor a wider monitoring range. Moreover, each external system 30 outputs control signal to the control module 34 through two transmission paths respectively, when one of the signal paths is interrupted, the ability of the correspondingly configured external system 30 to eliminate abnormal situations will not immediately fail. In addition, the human-machine operation module 33, the control module 34, and the equipment device 32 are all included in the external system 30, thereby providing a solution for the near-end operator to be closer to where the abnormal situation occurs to operate the human-machine operation module 33 for eliminating abnormal situations.

In order to protect the sensing data transmitted by the sensor module 31, the present application further provides a technical solution that enables the external system 30 to accurately feedback the abnormal situation data without affecting the elimination of abnormal situation.

Figure 6:
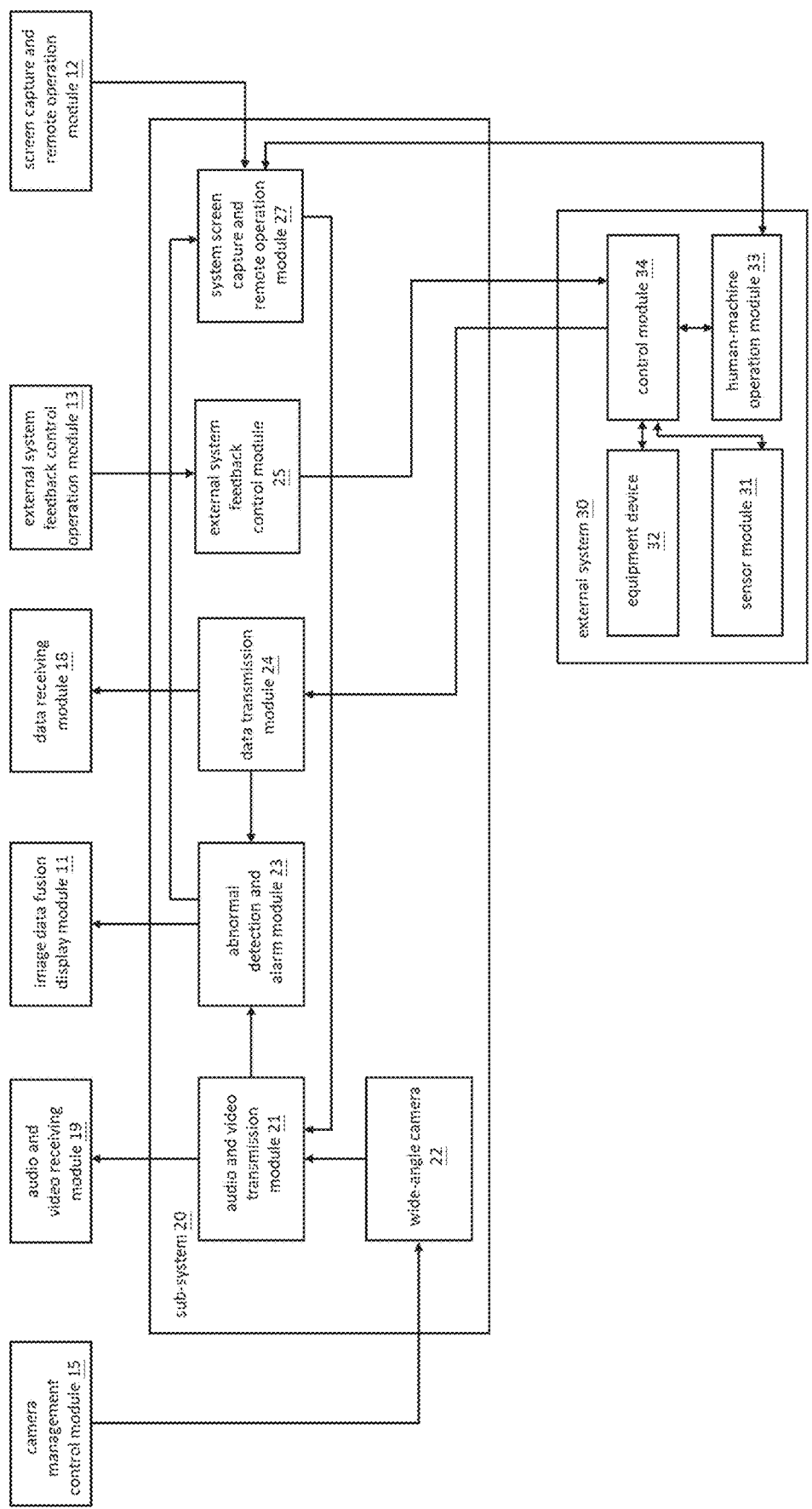
FIG. 6 is a block diagram of the sub-system and external system of the panoramic monitoring and feedback control system according to one embodiment of the present application.

Please refer to FIG. 6, which shows a block diagram of the sub-system and the external system of the panoramic monitoring and feedback control system according to yet another embodiment of the present application. In this embodiment, the external system 30 includes a sensor module 31, an equipment device 32, a human-machine operation module 33, and a control module 34. The difference between the embodiment provided in FIG. 6 and the embodiment provided in FIG. 5 is that in the embodiment provided in FIG. 6, the control module 34 controls the equipment device 32 according to the automatic operation signal, the local operation signal generated through the human-machine operation module 33, and the operation signal output through the human-machine operation module. Furthermore, the control module 34 receives the operation result signal feedbacked by the device being controlled and the sensing signal generated by the sensor module 31. The data transmission module 24 of the sub-system 20 directly receives the operation result signal and the sensing signal through the control module 34 of the external system. Therefore, in addition to the effect of allocating the risk that the panoramic monitoring system cannot eliminate abnormal situations due to signal transmission channel failure, in the external system 30, the transmission of the sensor module 31 to the control module 34 is completed, improving signal transmission performance between the sub-system 20 and the external system 30.

Figure 8:
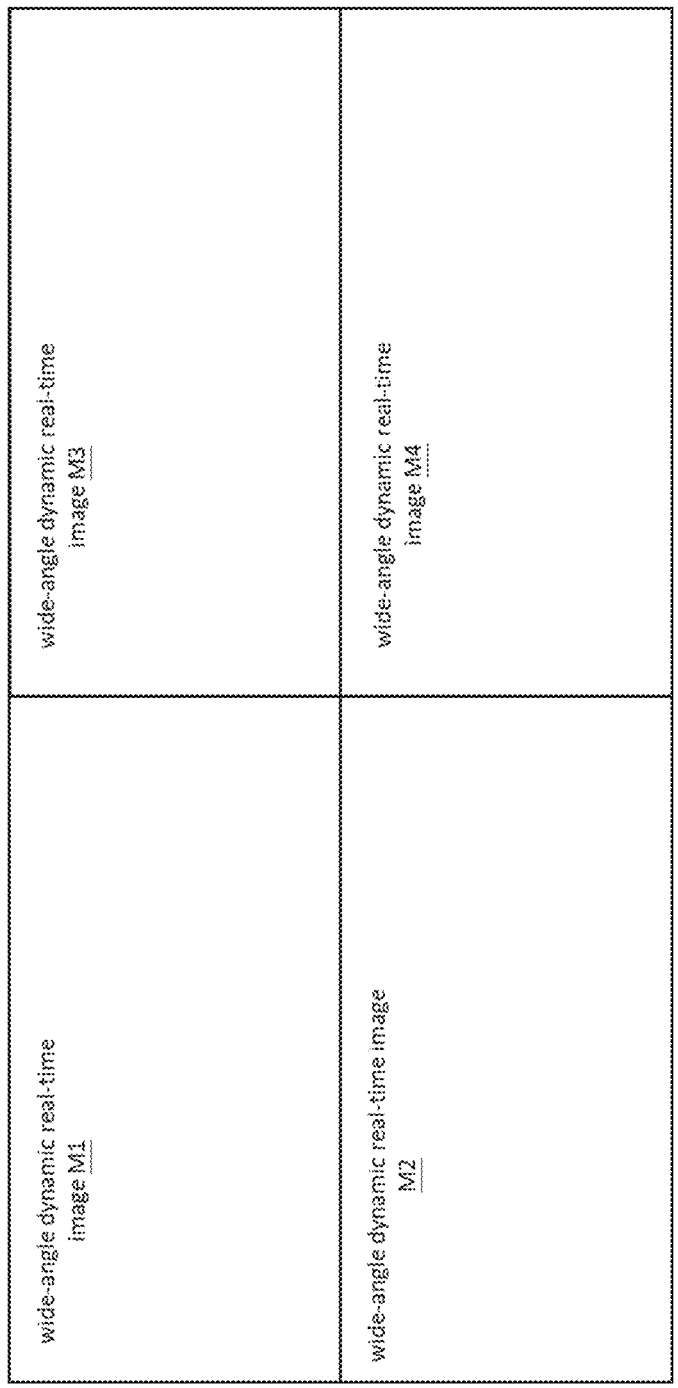
FIG. 8 is a schematic diagram of the real-time information screen of the monitored field displayed by the host-system of the panoramic monitoring and feedback control system according to one embodiment of the present application.
Figure 9:
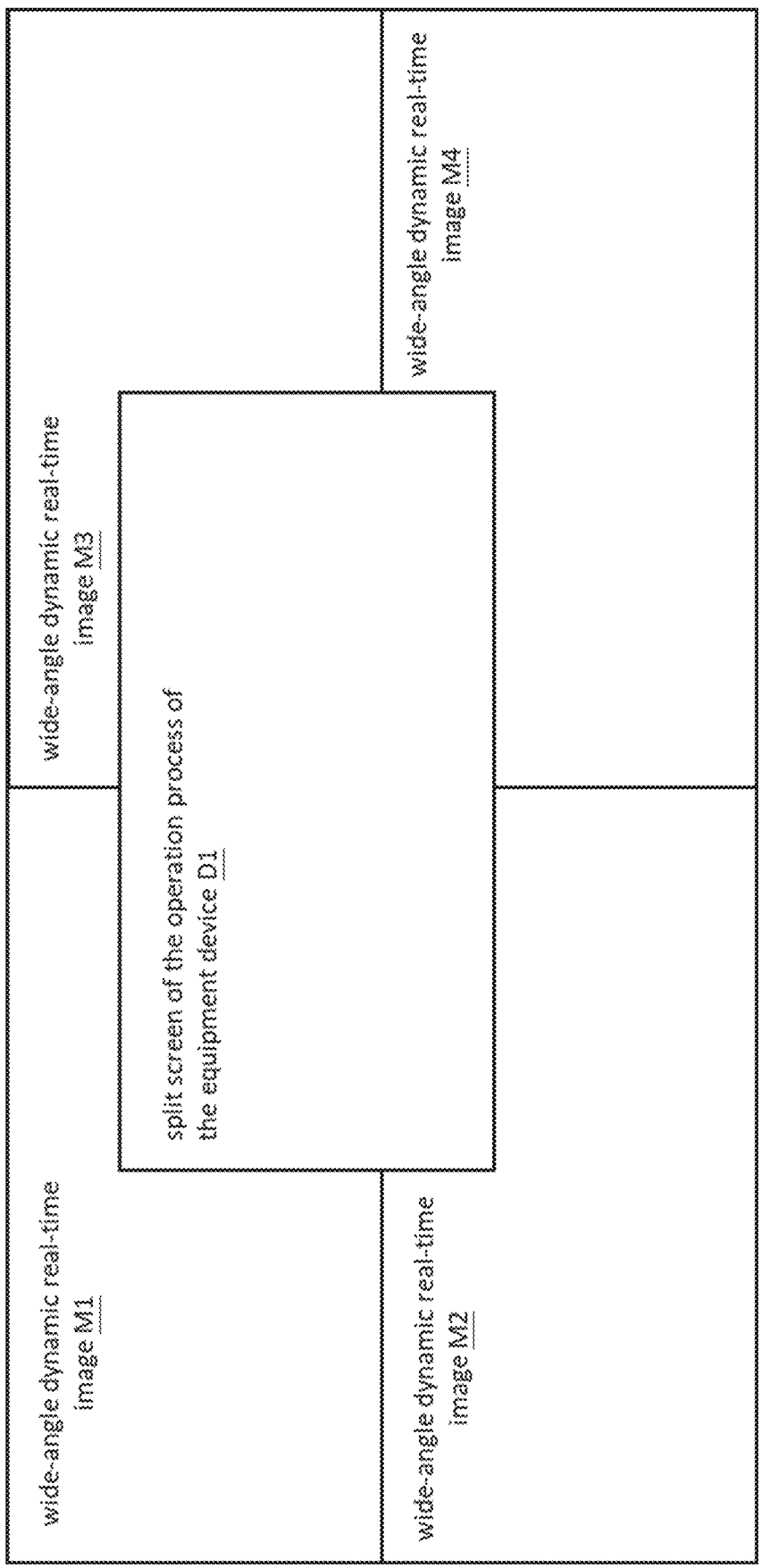
FIG. 9 is a schematic diagram of the real-time information screen of the monitored field displayed by the host-system of the panoramic monitoring and feedback control system when an abnormal situation occurs according to one embodiment of the present application.

For the real-time information screen displayed by the host-system 10, please refer to FIG. 8 and FIG. 9, which a schematic diagram of the real-time information screen of the monitored field displayed by the host-system of the panoramic monitoring and feedback control system according to one embodiment of the present application, and a schematic diagram of the real-time information screen of the monitored field displayed by the host-system of the panoramic monitoring and feedback control system when an abnormal situation occurs according to one embodiment of the present application. When the abnormal situation does not occur, the host-system 10 displays the wide-angle dynamic real-time images M1, M2, M3, and M4 captured by the wide-angle camera 22 of the sub-system 20 through the image data fusion display module 11. When the abnormal situation occurs, the host-system 10 not only displays the originally displayed wide-angle dynamic real-time images M1, M2, M3, and M4, but also further displays the split screen D1 of the equipment operation process.

Figure 7:
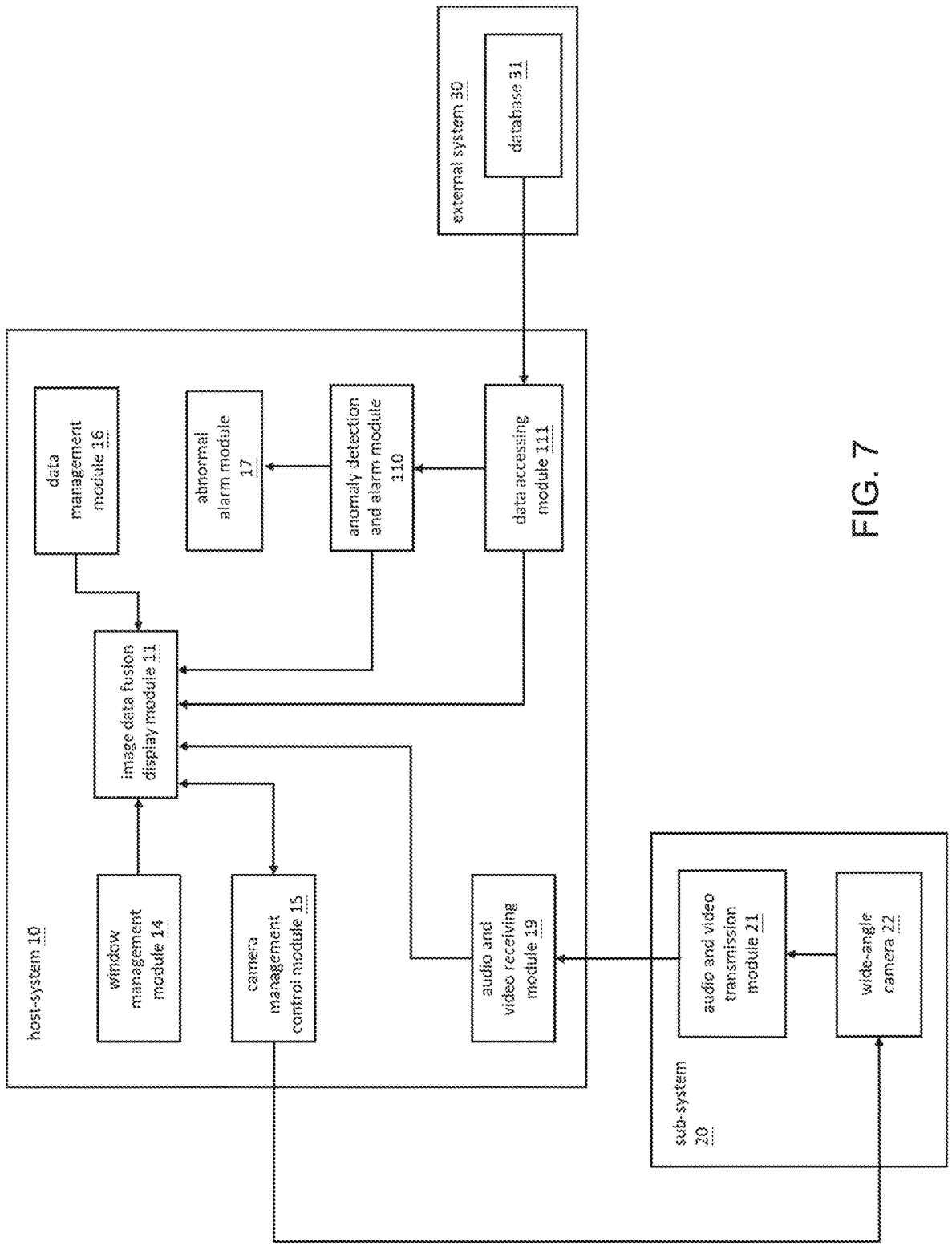
FIG. 7 is a block diagram of the panoramic monitoring and feedback control system according to one embodiment of the present application.

Please refer to FIG. 7, FIG. 7 is a block diagram of the panoramic monitoring and feedback control system according to one embodiment of the present application. In this embodiment, the host-system 10 displays a troubleshooting process video of the abnormal situation during the occurrence of the abnormal situation when the host-system 10 receives the data that satisfies the sensing condition from the data database 33. At this time, the troubleshooting process video is a video of a operation process of the equipment device in the wide-angle dynamic real-time image during a period of the abnormal situation, wherein the equipment device connected to the external system 30. The real-time information of the monitored field displayed by the host-system 10 includes a split screen of the operation process of the equipment device. A difference between this embodiment and the previous embodiment is that the equipment device is configured in the external system 30. At this time, the operation data of the equipment device includes: operation time, received instructions, sensing signals, and comparison results of sensing signals and operation signals, etc., are stored in the database 33 of the external system 30. Moreover, in this embodiment, the anomaly detection and alarm module 110 that analyzes the data in the data database 33 is set in the host-system 10. Therefore, the present application further provides a panoramic monitoring and control system in which the host system 10 bears most of the data analysis. Below, a detailed description of the contents of this embodiment will be continued.

Following the above, in the embodiment disclosed in FIG. 7, the host-system 10 includes: an image data fusion display module 11, anomaly detection and alarm module 110, a data accessing module 111, a window management module 14, a camera management control module 15, a data management module 16, an abnormality alarm module 17, an audio and video receiving module 19. The sub-system 20 includes: an audio and video transmission module 21 and a wide-angle camera 22. The external system 30 includes: a database 31. The data access module 111 receives the data transmitted by the data database 331 of the external system 30. The anomaly detection and alarm module 110 receives the data transmitted by the data access module 111 to analyze whether the sensing conditions are met. When the anomaly detection and alarm module 110 detects that the data transmitted by the data access module 111 meets the sensing conditions, the anomaly detection and alarm module 110 notifies the image data fusion display module 11 and the anomaly alarm module 17 that an abnormal situation occurs. Furthermore, the abnormality alarm module 17 controls an alarm of the connected alarm device. The image data fusion display module 11 displays on the connected display device an abnormality video recorded by the wide-angle camera 22 corresponding to the data transmitted by the data access module 111. Among them, for descriptions of the window management module 14, the camera management control module 15, the data management module 16, the abnormal alarm module 17, and the audio and video receiving module 19, please refer to the foregoing description, and the description will not be repeated here.

It should be noted that what is shown in FIG. 8 and FIG. 9 is only the content of the real-time information screen of the monitored field displayed by the host-system, and is not limited thereto. Other data, charts or detection records obtained through the analysis of the image data fusion display module 11 and the anomaly detection and alarm module 23 can also be displayed through the host system 10, which will not be described again here.

Figure 10:
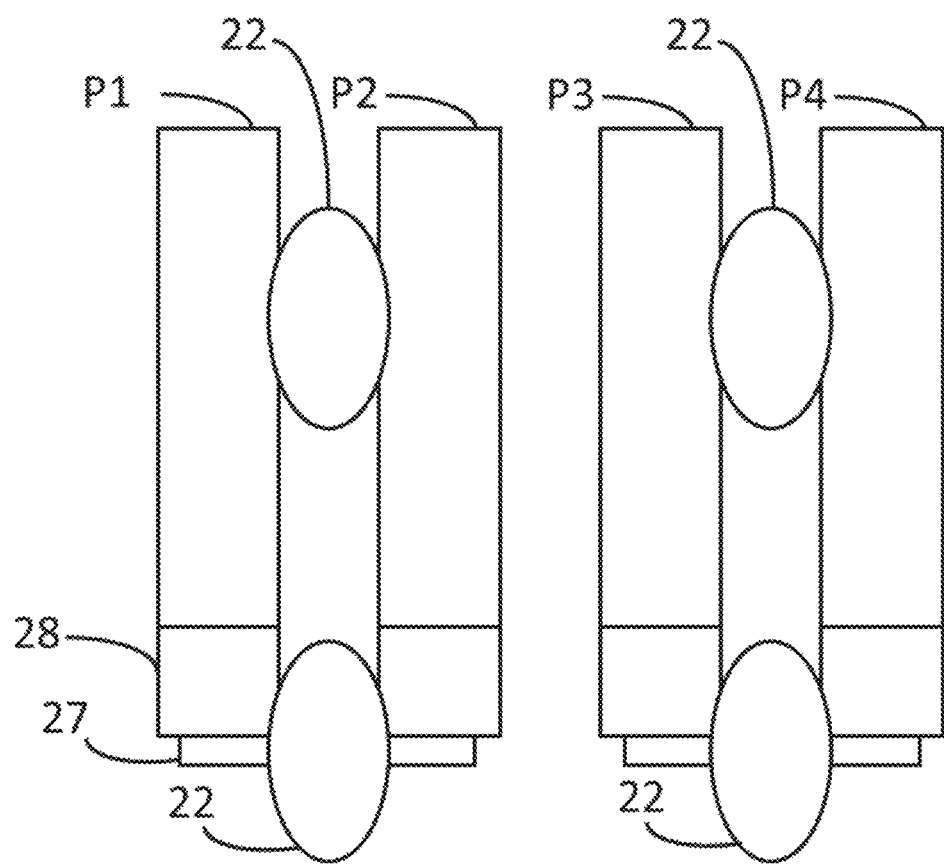
FIG. 10 is a schematic diagram of the on-site layout of the panoramic monitoring and feedback control system according to one embodiment of the present application.

Please continue to refer to FIG. 10, which shows a schematic diagram of the on-site layout of the panoramic monitoring and feedback control system according to one embodiment of the present application. It reveals that four wide-angle cameras 22 are respectively installed between the middle sections of production lines P1 and P2, between the middle sections of production lines P3 and P4, and between the human-machine operation module 28 and the system screen capture and remote operation module 27. When an abnormality occurs in the production lines P1, P2, P3, and P4, for example, the crane deviates from an established track and a color of the tank changes abnormally, the user can troubleshoot the abnormality by operating the human-machine operation module 28 remotely nearby, and through wide-angle cameras 22 deployed at different positions, the remote operator can also obtain accurate crane correction amounts or tank color feedback by comparing the image differences of different wide-angle cameras 22, and use the system screen capture and remote operation module 27 troubleshooting the abnormality. Moreover, the operation screen of the human-machine operation module 28 that eliminates abnormal situations can be recorded and presented in the host-system 10 in real time.

It should be noted that FIG. 10 only provides an example of a monitored field of the panoramic monitoring feedback control system of the present application. In different application fields, the distance relationship between the wide-angle camera 22, the system screen capture and remote operation module 27, the human-machine operation module 28 and the production line is not limited to the embodiment disclosed in FIG. 10.

In addition, the sensor module 25 involved in the aforementioned embodiment includes at least one of a variety of sensors such as: temperature sensor, chemical composition sensor, pressure sensor, infrared sensor, current sensor, voltage sensor, water level sensor, motor speed sensor, moisture content sensor, acid and alkali value sensor, humidity sensor, weight sensor, which provides at least one type of sensing data for the layout fields of different sensing targets to identify whether an abnormal situation occurs. The sensor types and detection types provided in the present application are only examples and are not limitations of the present application.

In addition, what needs to be added is that in one embodiment of the present application, the sensor module 31 is also connected to the equipment device to sense the operating status parameters of the equipment device. Therefore, the environmental parameters of the monitoring environment mentioned in the present application include the operating status parameters of the equipment and devices.

In one embodiment of the present application, the host-system 10 and the sub-system 20 are also respectively equipped with communication devices. The user can communicate in real time with the communication device of the sub-system through the communication device of the host-system. For example, the supervisor of the host-system instructs the on-site personnel where the sub-system 20 and the external system 30 are located through the communication device to immediately eliminate the abnormal situation. Or, in another embodiment, the human-machine operation modules 28 and 33 include communication devices, so that staff operating the human-machine operation modules 28 and 33 can communicate with personnel at the host-system 10 through the communication device.

Figure 11:
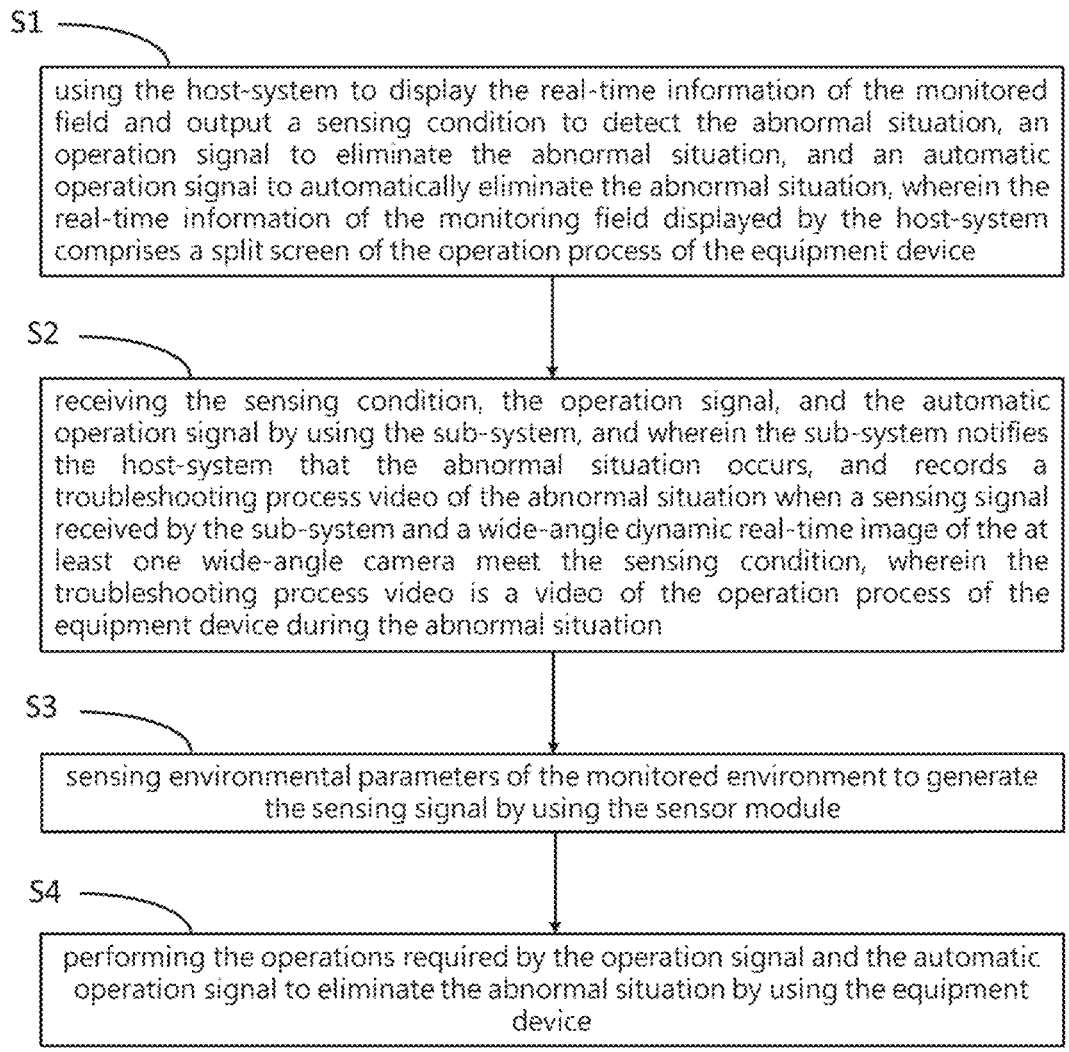
FIG. 11 is a schematic flow chart of a panoramic monitoring and feedback control method according to one embodiment of the present application.

Please refer to FIG. 11, FIG. 11 is a schematic flow chart of a panoramic monitoring and feedback control method according to one embodiment of the present application. The present application also provides a panoramic monitoring and feedback control method, which performed by the host-system 10, at least one sub-system 20 connected to the host-system 10, and the external system 30 connected to the sub-system 20 and including the sensor module 31 and the equipment device 32, wherein the method is executed to assist the monitor in obtaining real-time information of the monitored field and troubleshooting abnormal situations, wherein the panoramic monitoring and feedback control method includes:

S1: displaying the real-time information of the monitored field and outputting a sensing condition to detect the abnormal situation, an operation signal to eliminate the abnormal situation, and an automatic operation signal to automatically eliminate the abnormal situation by using the host-system, wherein the real-time information of the monitored field displayed by the host-system includes a split screen of the operation process of the equipment device.

S2: receiving the sensing condition, the operation signal, and the automatic operation signal by using the sub-system, and wherein the sub-system notifies the host-system that the abnormal situation occurs, and records a troubleshooting process video of the abnormal situation when a sensing signal received by the sub-system and a wide-angle dynamic real-time image of the at least one wide-angle camera meet the sensing condition, wherein the troubleshooting process video is a video of the operation process of the equipment device during the abnormal situation.

S3: sensing environmental parameters of the monitored environment to generate the sensing signal by using the sensor module.

S4: performing the operations required by the operation signal and the automatic operation signal to eliminate the abnormal situation by using the equipment device.

It should be noted that in one embodiment of the present application, the process S1 further includes:

S11: outputting the operation signal by using an screen capture and remote operation module.

At this time, the panoramic monitoring and feedback control method further includes: S111 receiving a control authority data feedbacked by each sub-system through the screen capture and remote operation module.

Or, in another embodiment of the present application, process S1 further includes:

S12: outputting the automatic operation signal by using an external system feedback control operation module.

Or, in yet another embodiment of the present application, the step of receiving the sensing condition, the operation signal, and the automatic operation signal by using the sub-system in process S2 includes:

S21: receiving the automatic operation signal by using a system feedback control system.

Moreover, the panoramic monitoring and feedback control method further includes:

S211: outputting the automatic operation signal to the external system by using the external system feedback control module.

Or, in another embodiment of the present application, the step of receiving the sensing condition, the operation signal, and the automatic operation signal by using the sub-system in process S2 includes:

S212: receiving the operation signal by using a system screen capture and remote operation module.

Moreover, the step of recording the troubleshooting process video of the abnormal situation in process S2 includes:

S213: recording the troubleshooting process video through the system screen capture and remote operation module.

Moreover, the panoramic monitoring and feedback control method further includes:

S5: outputting the control authority data to the screen capture and remote operation module by using the system screen capture and remote operation module.

Or, in another embodiment of the present application, receiving the sensing condition, the operation signal, and the automatic operation signal by using the sub-system in the step S2 includes:

S214: receiving the automatic operation signal by using an external system feedback control module.

Moreover, the panoramic monitoring and feedback control method further includes:

S6: operating a human-machine operation module by an operator at a location of the sub-system, and outputting a local operation signal accordingly.

S7: controlling the equipment device based on the automatic operation signal, the local operation signal, and the operation signal by a control module, and receiving an operation result signal feedback from the equipment device by the control module.

S8: receiving the operation result signal from the control module and the sensing signal from the sensor module by a data transmission module, and wherein the received operation result signal and the sensing signal are transmitted to the host-system through the data transmission module.

S9: capturing the split screen of the process in which the human-machine operation module is operated by the operator at the sub-system by using the system screen capture and remote operation module.

S10: displaying a split screen including a process in which the human-machine operation module is operated by an operator at a location of the sub-system by using the host-system.

Or, in another embodiment of the present application, receiving the sensing condition, the operation signal, and the automatic operation signal by using the sub-system in the step S2 includes:

S214: receiving the automatic operation signal by using an external system feedback control module.

Moreover, the panoramic monitoring and feedback control method further includes:

S6: operating a human-machine operation module by an operator at a location of the sub-system, and outputting a local operation signal accordingly.

S7: controlling the equipment device based on the automatic operation signal, the local operation signal, and the operation signal by a control module, and receiving an operation result signal feedback from the equipment device by the control module.

S81: receiving the operation result signal and the sensing signal from the control module by a data transmission module, and wherein the received operation result signal and the sensing signal are transmitted to the host-system through the data transmission module.

S9: capturing the split screen of the process in which the human-machine operation module is operated by the operator at the sub-system by using the system screen capture and remote operation module.

S10: displaying a split screen including a process in which the human-machine operation module is operated by an operator at a location of the sub-system by using the host-system.

Or, in another embodiment of the present application, in the aforementioned process S1, the step of using the host-system to display the real-time information of the monitored field and output a sensing condition to detect the abnormal situation, an operation signal to eliminate the abnormal situation, and an automatic operation signal to automatically eliminate the abnormal situation includes:

S11: outputting the operation signal by using the screen capture and remote operation module.

S12: outputting the automatic operation signal by using an external system feedback control operation module.

At the same time, the step of receiving the sensing condition, the operation signal, and the automatic operation signal by using the sub-system includes:

S214: receiving the automatic operation signal by using an external system feedback control module.

S212: receiving the operation signal by using a system screen capture and remote operation module.

Moreover, the panoramic monitoring and feedback control method further includes:

S11: driving the equipment device through the external system feedback control module.

S12: receiving a control authority data feedback from each sub-system by using the screen capture and remote operation module.

S5: outputting the control authority data to the screen capture and remote operation module by using the system screen capture and remote operation module.

S213: recording the troubleshooting process video by using the system screen capture and remote operation module.

S13: transmitting signals to the host-system by using a data transmission module.

Or, in another embodiment of the present application, the panoramic monitoring and feedback control method further includes:

S14: using a human-machine operation module for operation by the operator at the location of the external system, and outputting a local operation signal accordingly.

S15: controlling the equipment device based on the automatic operation signal, the local operation signal, and the operation signal by a control module.

S16: receiving an operation result signal feedbacked from the control of the equipment device by using the control module, and transmitting the operation result signal to the data transmission module.

S17: transmitting the sensing signal to the data transmission module by using the sensor module.

S9: capturing the split screen of the process in which the human-machine operation module is operated by the operator at the sub-system by using the system screen capture and remote operation module.

S10: displaying a split screen including a process in which the human-machine operation module is operated by an operator at a location of the sub-system by using the host-system.

Furthermore, transmitting signals to the host-system by using a data transmission module the step S13 includes:

S131: transmitting the operation result signal from the control module and the sensing signal from the sensor module to the host-system by using the data transmission module.

Or, in another embodiment of the present application, the panoramic monitoring and feedback control method further includes:

S14: using a human-machine operation module for operation by the operator at the location of the external system, and outputting a local operation signal accordingly.

S15: controlling the equipment device based on the automatic operation signal, the local operation signal, and the operation signal by a control module.

S18: receiving an operation result signal feedbacked by the control of the equipment device and the sensing signal generated by the sensor module by using the control module, and transmitting the operation result signal and the sensing signal to the data transmission module.

S9: capturing the split screen of the process in which the human-machine operation module is operated by the operator at the sub-system by using the system screen capture and remote operation module.

S10: displaying a split screen including a process in which the human-machine operation module is operated by an operator at a location of the sub-system by using the host-system.

Furthermore, transmitting signals to the host-system by using a data transmission module of the step S13 including:

S132: transmitting the operation result signal and the sensing signal from the control module to the host-system by using the data transmission module.

The present application has at least the following beneficial effects: the present application provides a panoramic monitoring feedback control system and a panoramic monitoring and feedback control method, which uses the host-system to display the split screen of the equipment device operation process during the abnormal situation, and at the same time simultaneously operates the equipment devices and receives external feedback through a plurality of control methods to accurately control the equipment covered by real-time information in the monitored field. Moreover, the retained operation history is used to improve the monitoring feedback control effect and reduce the time spent on feedback control.

It should be noted that the combination of each element in the present application preferably forms the above multiple embodiments, but this should not be interpreted as a limitation of the present application. That is, each element in the present application can also have more combinations, not limited to the above multiple embodiments.

In this paper, specific examples are used to illustrate the principles and implementation methods of the present application, and the descriptions of the above embodiments are only used to help understand the technical solutions and core ideas of the present application. Those of ordinary skill in the art should understand that they can still modify the technical solutions described in the foregoing embodiments, or perform equivalent replacements for some of the technical features. These modifications or replacements do not make the essence of the corresponding technical solutions depart from a scope of the technical solutions of the various embodiments of the present application.

What is claimed is:

1. A panoramic monitoring and feedback control system configured to assist monitors in obtaining a real-time information of a monitored field and eliminating an abnormal situation, wherein the panoramic monitoring and feedback control system comprises:

a host-system configured to display the real-time information of the monitored field and output a sensing condition to detect the abnormal situation, an operation signal to eliminate the abnormal situation, and an automatic operation signal to automatically eliminate the abnormal situation;

at least one sub-system connected to the host-system, wherein the sub-system comprises a plurality of wide-angle cameras, the sub-system configured to receive the sensing condition, the operation signal, and the automatic operation signal, and wherein the sub-system notifies the host-system that the abnormal situation occurs, and records a troubleshooting process video of the abnormal situation when a sensing signal received by the sub-system and a wide-angle dynamic real-time image of the at least one wide-angle camera meet the sensing condition; and at least one external system connected to the sub-system, wherein the external system comprises:
a sensor module configured to sense environmental parameters of the monitored environment to generate the sensing signal; and
an equipment device configured for on-site personnel to operate and perform the operations required by the operation signal and the automatic operation signal to eliminate the abnormal situation;
wherein the troubleshooting process video is a video of the operation process of the equipment device during the abnormal situation, and wherein the real-time information of the monitored field displayed by the host-system comprises a split screen of the operation process of the equipment device.

2. The panoramic monitoring and feedback control system of claim 1, wherein the host-system further comprises:
a screen capture and remote operation module connected to each sub-system, wherein the host-system outputs the operation signal through the screen capture and remote operation module, and uses the screen capture and remote operation module to receive a control authority data feedbacked by each sub-system.

3. The panoramic monitoring and feedback control system of claim 2, wherein the sub-system further comprises:
a system screen capture and remote operation module connected to the screen capture and remote operation module, wherein the system screen capture and remote operation module is configured to receive the operation signal and output the control authority data to the screen capture and remote operation module;
wherein the sub-system records the troubleshooting process video through the system screen capture and remote operation module.

4. The panoramic monitoring and feedback control system of claim 3, wherein the sub-system further comprises:
a human-machine operation module connected to the system screen capture and remote operation module, wherein the human-machine operation module is configured to be operated by an operator at the sub-system and outputs a local operation signal accordingly;
an external system feedback control module connected to the host-system, wherein the sub-system receives the automatic operation signal through the external system feedback control module;
a control module connected to the external system feedback control module and the human-machine operation module, wherein the control module is configured to control the equipment device according to the automatic operation signal, the local operation signal, and the operation signal, and receive an operation result signal feedbacked by the equipment device; and
a data transmission module connected to the control module and the sensor module, wherein the data transmission module receives the operation result signal from the control module, and receives the sensing signal from the sensor module, and wherein the data transmission module transmits the received operation result signal and the sensing signal to the host-system;
wherein the shunt picture of the operation process of the equipment device comprises the shunt picture of the process of the human-machine operation module being operated by the operator of the sub-system, and wherein the t shunt picture of the process of the human-machine operation module being operated by the operator of the sub-system is captured through the system screen capture and remote operation module.

5. The panoramic monitoring and feedback control system of claim 3, wherein the sub-system further comprises:
a human-machine operation module connected to the system screen capture and remote operation module, wherein the human-machine operation module is configured to be operated by an operator at the sub-system and outputs a local operation signal accordingly;
an external system feedback control module connected to the host-system, wherein the sub-system receives the automatic operation signal through the external system feedback control module;
a control module connected to the external system feedback control module and the human-machine operation module, wherein the control module is configured to control the equipment device according to the automatic operation signal, the local operation signal, and the operation signal, and receive an operation result signal feedbacked by the equipment device and the sensing signal generated by the sensor module; and
a data transmission module connected to the control module, wherein the data transmission module receives the operation result signal and the sensing signal through the control module, and transmits the received operation result signal and the sensing signal to the host-system;
wherein the shunt picture of the operation process of the equipment device comprises the shunt picture of the process of the human-machine operation module being operated by the operator of the sub-system, and wherein the split screen of the process in which the human-machine operation module is operated by the operator at the sub-system is captured through the system screen capture and remote operation module.

6. The panoramic monitoring and feedback control system of claim 1, wherein the host-system further comprises:
an external system feedback control operation module connected to each sub-system, wherein the host-system outputs the automatic operation signal through the external system feedback control operation module.

7. The panoramic monitoring and feedback control system of claim 1, wherein the sub-system further comprises:
an external system feedback control module connected to the host-system, wherein the sub-system receives the automatic operation signal through the external system feedback control module;
wherein the sub-system also outputs the automatic operation signal to the external system through the external system feedback control module.

8. The panoramic monitoring and feedback control system of claim 1, wherein the host-system further comprises:
a screen capture and remote operation module, wherein the host-system outputs the operation signal through the screen capture and remote operation module, and receives a control authority data feedbacked by each sub-system through the screen capture and remote operation module; and
an external system feedback control operation module connected to each sub-system, wherein the host-system outputs the automatic operation signal through the external system feedback control operation module;
the sub-system further comprises:
an external system feedback control module, wherein the sub-system receives the automatic operation signal through the external system feedback control module, and drives the equipment device through the external system feedback control module;

a system screen capture and remote operation module connected to the screen capture and remote operation module, wherein the system screen capture and remote operation module is configured to receive the operation signal and output the control authority data to the screen capture and remote operation module, and wherein the sub-system records the troubleshooting process video through the system screen capture and remote operation module; and a data transmission module configured to transmit signals to the host-system.

9. The panoramic monitoring and feedback control system of claim 8, wherein the external system further comprises:

a human-machine operation module connected to the system screen capture and remote operation module, wherein the human-machine operation module is configured to be operated by an operator at a location of the external system and outputs a local operation signal accordingly; and a control module configured to control the equipment device based on the automatic operation signal, the local operation signal, and the operation signal, wherein the control module receives an operation result signal feedbacked by the control of the equipment device, and transmit the operation result signal to the data transmission module;

wherein the sensing signal of the sensor module is directly transmitted to the data transmission module through the sensor module, and the data transmission module transmits the received operation result signal and the sensing signal to the host-system;

wherein the split screen of the operation process of the equipment device comprises the split screen of the process of the human-machine operation module being operated by the operator at the location of the external system, and the split screen of the process of the human-machine operation module being operated by the operator at the location of the external system is captured through the system screen capture and remote operation module.

10. The panoramic monitoring and feedback control system of claim 8, wherein the external system further comprises:

a human-machine operation module connected to the system screen capture and remote operation module, wherein the human-machine operation module is configured to be operated by an operator at the location of the external system and outputs a local operation signal accordingly; and a control module configured to control the equipment device according to the automatic operation signal, the local operation signal, and the operation signal, wherein the control module receives an operation result signal feedbacked by the control of the equipment device, and the sensing signal generated by the sensor module;

wherein the data transmission module transmits the operation result signal and the sensing signal received by the control module to the host-system;

wherein the split screen of the operation process of the equipment device comprises the split screen of the process of the human-machine operation module being operated by the operator at the location of the external system, and wherein the human-machine operation module is operated by the operator at the location of the external system, and wherein the split screen of the process is captured through the system screen capture and remote operation module.

11. A panoramic monitoring and feedback control system to assist monitors in obtaining a real-time information of a monitored field, wherein the panoramic monitoring and feedback control system comprises:

a host-system configured to display the real-time information of the monitored field, wherein the host-system stores a sensing condition for detecting an abnormal situation;

at least one sub-system connected to the host-system, wherein the sub-system comprises a plurality of wide-angle cameras and transmits a wide-angle dynamic real-time image of at least one wide-angle camera to the host-system; and at least one external system connected to the host-system, wherein the external system comprises a database;

wherein the host-system displays a troubleshooting process video of the abnormal situation during the occurrence of the abnormal situation when the host-system receives data that satisfies the sensing condition from the data database, and wherein the troubleshooting process video is a video of an operation process of an equipment device connected to the external system in the wide-angle dynamic real-time image, and wherein the real-time information of the monitored field displayed by the host-system comprises a split screen of the operation process of the equipment device.

12. The panoramic monitoring and feedback control method of claim 11, wherein the step of displaying the real-time information of the monitored field and outputting a sensing condition to detect the abnormal situation, an operation signal to eliminate the abnormal situation, and an automatic operation signal to automatically eliminate the abnormal situation by using the host-system comprises:

outputting the operation signal by using the screen capture and remote operation module;

the panoramic monitoring and feedback control method further comprises:

receiving a control authority data feedbacked by each sub-system through the screen capture and remote operation module.

13. The panoramic monitoring and feedback control method of claim 11, wherein the step of displaying the real-time information of the monitored field and outputting a sensing condition to detect the abnormal situation, an operation signal to eliminate the abnormal situation, and an automatic operation signal to automatically eliminate the abnormal situation by using the host-system comprises:

outputting the automatic operation signal by using an external system feedback control operation module.

14. The panoramic monitoring and feedback control method of claim 11, wherein the step of receiving the sensing condition, the operation signal, and the automatic operation signal by using the sub-system comprises:

receiving the automatic operation signal by using a system feedback control system; and the panoramic monitoring and feedback control method further comprises:

outputting the automatic operation signal to the external system by using the external system feedback control module.

15. The panoramic monitoring and feedback control method of claim 14, wherein the step of receiving the sensing condition, the operation signal, and the automatic operation signal by using the sub-system comprises:

receiving the automatic operation signal by using an external system feedback control module; and the panoramic monitoring and feedback control method further comprises:

operating a human-machine operation module by an operator at a location of the sub-system, and outputting a local operation signal accordingly;

controlling the equipment device based on the automatic operation signal, the local operation signal, and the operation signal by a control module, and receiving an operation result signal feedback from the equipment device by the control module;

receiving the operation result signal from the control module and the sensing signal from the sensor module by a data transmission module, and wherein the received operation result signal and the sensing signal are transmitted to the host-system through the data transmission module;

capturing the split screen of the process in which the human-machine operation module is operated by the operator at the sub-system by using the system screen capture and remote operation module; and displaying a split screen comprising a process in which the human-machine operation module is operated by an operator at a location of the sub-system by using the host-system.

16. The panoramic monitoring and feedback control method of claim 14, wherein the step of receiving the sensing condition, the operation signal, and the automatic operation signal by using the sub-system comprises:

receiving the automatic operation signal by using an external system feedback control module; and the panoramic monitoring and feedback control method further comprises:

operating a human-machine operation module by an operator at a location of the sub-system, and outputting a local operation signal accordingly;

controlling the equipment device based on the automatic operation signal, the local operation signal, and the operation signal by a control module, and receiving an operation result signal feedback from the equipment device by the control module;

receiving the operation result signal and the sensing signal from the control module by a data transmission module, and wherein the received operation result signal and the sensing signal are transmitted to the host-system through the data transmission module;

capturing the split screen of the process in which the human-machine operation module is operated by the operator at the sub-system by using the system screen capture and remote operation module; and displaying a split screen comprising a process in which the human-machine operation module is operated by an operator at a location of the sub-system by using the host-system.

17. The panoramic monitoring and feedback control method of claim 16, wherein the panoramic monitoring and feedback control method further comprises:

using a human-machine operation module for operation by the operator at the location of the external system, and outputting a local operation signal accordingly;

controlling the equipment device based on the automatic operation signal, the local operation signal, and the operation signal by a control module;

receiving an operation result signal feedbacked from the control of the equipment device by using the control module, and transmitting the operation result signal to the data transmission module;

transmitting the sensing signal to the data transmission module by using the sensor module;

capturing the split screen of the process in which the human-machine operation module is operated by the operator at the sub-system by using the system screen capture and remote operation module; and displaying a split screen comprising a process in which the human-machine operation module is operated by an operator at a location of the sub-system by using the host-system;

the step of transmitting signals to the host-system by using a data transmission module comprises:

transmitting the operation result signal from the control module and the sensing signal from the sensor module to the host-system by using the data transmission module.

18. The panoramic monitoring and feedback control method of claim 11, wherein the step of outputting the sensing condition to detect the abnormal situation, an operation signal to eliminate the abnormal situation, and the automatic operation signal to automatically eliminate the abnormal situation by using the host-system comprises:

outputting the operation signal by using a screen capture and remote operation module; and outputting the automatic operation signal by using an external system feedback control operation module;

the step of receiving the sensing condition, the operation signal, and the automatic operation signal by using the sub-system comprises:

receiving the automatic operation signal by using an external system feedback control module; and receiving the operation signal by using a system screen capture and remote operation module; and the panoramic monitoring and feedback control method further comprises:

driving the equipment device through the external system feedback control module;

receiving a control authority data feedbacked from each sub-system by using the screen capture and remote operation module;

outputting the control authority data to the screen capture and remote operation module by using the system screen capture and remote operation module;

recording the troubleshooting process video by using the system screen capture and remote operation module; and transmitting signals to the host-system by using a data transmission module.

19. A panoramic monitoring and feedback control method, performed by a host-system, at least one sub-system connected to the host-system, and an external system connected to the sub-system and comprising a sensor module and an equipment device, wherein the method is executed to assist the monitor in obtaining real-time information of the monitored field and eliminating an abnormal situation, wherein the panoramic monitoring and feedback control method comprises:

displaying the real-time information of the monitored field and outputting a sensing condition to detect the abnormal situation, an operation signal to eliminate the abnormal situation, and an automatic operation signal to automatically eliminate the abnormal situation by using the host-system, wherein the real-time information of the monitored field displayed by the host-system comprises a split screen of an operation process of the equipment device;

receiving the sensing condition, the operation signal, and the automatic operation signal by using the sub-system, and wherein the sub-system notifies the host-system that the abnormal situation occurs, and records a troubleshooting process video of the abnormal situation when a sensing signal received by the sub-system and a wide-angle dynamic real-time image of the at least one wide-angle camera meet the sensing condition, wherein the troubleshooting process video is a video of the operation process of the equipment device during the abnormal situation; and using the sensor module to sense environmental parameters of the monitored environment to generate the sensing signal; and using the equipment device to perform the operations required by the operation signal and the automatic operation signal to eliminate the abnormal situation.

20. The panoramic monitoring and feedback control method of claim 19, wherein the step of receiving the sensing condition, the operation signal, and the automatic operation signal by using the sub-system comprises:

receiving the operation signal by using a system screen capture and remote operation module;

the step of recording the troubleshooting process video of the abnormal situation comprises:

recording the troubleshooting process video through the system screen capture and remote operation module; and the panoramic monitoring and feedback control method further comprises:

outputting the control authority data to the screen capture and remote operation module by using the system screen capture and remote operation module.

* * * * *